(12) United States Patent
Qin et al.

(10) Patent No.: US 12,494,649 B2
(45) Date of Patent: Dec. 9, 2025

(54) PHOTOVOLTAIC INVERTER AND CONTROL METHOD THEREOF

(71) Applicant: SHANGHAI SIGEYUAN INTELLIGENT TECHNOLOGY CO., LTD, Shanghai (CN)

(72) Inventors: Yijin Qin, Shanghai (CN); Zhimin Jiang, Shanghai (CN)

(73) Assignee: SHANGHAI SIGEYUAN INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 18/824,960

(22) Filed: Sep. 5, 2024

(65) Prior Publication Data

US 2025/0038538 A1   Jan. 30, 2025

(30) Foreign Application Priority Data

Jul. 6, 2023   (CN) .......................... 202310828293.1

(51) Int. Cl.
*H02J 3/38*   (2006.01)
*H02M 7/5387*   (2007.01)
*H02M 7/5395*   (2006.01)

(52) U.S. Cl.
CPC ............. *H02J 3/38* (2013.01); *H02M 7/5387* (2013.01); *H02M 7/5395* (2013.01); *H02J 2300/24* (2020.01)

(58) Field of Classification Search
CPC ....... H02J 3/38; H02J 2300/24; H02M 7/5387
See application file for complete search history.

(56) References Cited

FOREIGN PATENT DOCUMENTS

CN   107612296 B   *   2/2019

* cited by examiner

*Primary Examiner* — Robert L Deberadinis
(74) *Attorney, Agent, or Firm* — Bayramoglu Law Offices LLC

(57) ABSTRACT

A photovoltaic inverter and a control method thereof are provided. The photovoltaic inverter includes: a three-phase bridge arm, including an A-phase bridge arm, a B-phase bridge arm, and a C-phase bridge arm, where a midpoint of the A-phase bridge arm is electrically connected to an A-phase line, a midpoint of the B-phase bridge arm is electrically connected to a B-phase line, a midpoint of the C-phase bridge arm is electrically connected to a C-phase line, and a midpoint of any one of the A-phase bridge arm, the B-phase bridge arm, and the C-phase bridge arm is also electrically connected to a neutral wire through a freewheeling branch; and a switching circuit electrically connected between the neutral wire and a user side.

20 Claims, 10 Drawing Sheets

PHOTOVOLTAIC INVERTER AND CONTROL METHOD THEREOF

CROSS-REFERENCE TO THE RELATED APPLICATIONS

This application is based upon and claims priority to Chinese Patent Application No. 202310828293.1, filed on Jul. 6, 2023, the entire contents of which are incorporated herein by reference.

TECHNICAL FIELD

The present disclosure relates to the technical field of photovoltaic power generation, and more specifically, to a photovoltaic inverter and a control method thereof.

BACKGROUND

With improvement to people's living standards and technological progress in society, electric energy has become an essential energy source that people must rely on in their daily lives. However, primary energy sources such as coal and oil are gradually decreasing. In addition, while people use the primary energy sources, huge pollution is caused to the environment. A fundamental solution to energy source problems is to develop environmentally friendly renewable energy sources, and solar power generation is an important development direction.

In the field of solar power generation, a photovoltaic inverter, as a core device, inverts direct current (DC) electric energy generated by a solar panel into alternating current (AC) electric energy that is consistent with a grid in the system, and merges the AC electric energy into the grid. The photovoltaic inverter is not only a power generation device, but also very important electrical equipment in an electrical system. For safety reasons, most of current power supply systems are TN-S electrical systems, which require discrete neutral and ground wires on a user side. Non-current-carrying parts such as a housing of the electrical equipment must be reliably grounded to avoid a hidden electrical accident. From a perspective of electrical safety, the photovoltaic inverter also needs to adopt a three-phase four-wire system for wiring. However, an existing photovoltaic inverter adopting the three-phase four-wire system can only use sine wave pulse width modulation (SPWM) control during voltage modulation, which is not conducive to improving efficiency of the photovoltaic inverter.

SUMMARY

In view of this, the present disclosure provides a photovoltaic inverter and a control method thereof, which effectively solve existing technical problems. A current loop of a neutral wire is connected or blocked through a switching circuit, such that an SPWM mode and a common-mode voltage injection modulation mode of the photovoltaic inverter can be flexibly switched. In this way, the photovoltaic inverter can reduce a switching loss and improve its efficiency in the common-mode voltage injection modulation mode.

To achieve the foregoing objective, the technical solutions provided in the present disclosure are as follows:

A photovoltaic inverter includes:
  a three-phase bridge arm, including an A-phase bridge arm, a B-phase bridge arm, and a C-phase bridge arm, where a midpoint of the A-phase bridge arm is electrically connected to an A-phase line, a midpoint of the B-phase bridge arm is electrically connected to a B-phase line, a midpoint of the C-phase bridge arm is electrically connected to a C-phase line, and a midpoint of any one of the A-phase bridge arm, the B-phase bridge arm, and the C-phase bridge arm is also electrically connected to a neutral wire through a freewheeling branch, where the midpoint of the any one of the A-phase bridge arm, the B-phase bridge arm, and the C-phase bridge arm is a connection point between an upper bridge arm and a lower bridge arm; and
  a switching circuit electrically connected between the neutral wire and a user side, where the switching circuit is configured to block a current loop of the neutral wire in response to control.

Optionally, the freewheeling branch is electrically connected to a grid connected end of the neutral wire; and
  the switching circuit includes a first switch, where a first terminal of the first switch is electrically connected to the grid connected end, and a second terminal of the first switch is electrically connected to the user side.

Optionally, the switching circuit further includes a second switch to an $N^{th}$ switch, where N is an integer greater than or equal to 2; and
  at least two of the first switch to the $N^{th}$ switch are connected in series with each other.

Optionally, any one of the first switch to the $N^{th}$ switch is an electromagnetic relay, a DC/AC contactor, or a semiconductor switching device.

Optionally, on/off of the switching circuit is controlled based on a working state of the photovoltaic inverter and interphase states of various output phases; and
  if the photovoltaic inverter is in a grid connected state and an interphase balance is achieved between the output phases, the switching circuit is controlled to be disconnected, and modulation control is performed on the output phases as a whole;
  if the photovoltaic inverter is in a grid connected state and an interphase imbalance occurs between the output phases, the switching circuit is controlled to be closed, and modulation control is separately performed on the output phases; or
  if the photovoltaic inverter is in an off-grid state, the switching circuit is controlled to be closed, and modulation control is separately performed on the output phases.

Optionally, when the photovoltaic inverter is in the grid connected state and the interphase balance is achieved between the output phases, if the interphase states of the output phases of the photovoltaic inverter switch from the interphase balance to the interphase imbalance, the switching circuit is controlled to be closed from being disconnected, and the modulation control performed on the output phases as a whole is switched to the modulation control separately performed on the output phases;
  when the photovoltaic inverter is in the grid connected state and the interphase balance is achieved between the output phases, if the photovoltaic inverter switches from the grid connected state to the off-grid state, the switching circuit is controlled to be closed from being disconnected, and the modulation control performed on the output phases as a whole is switched to the modulation control separately performed on the output phases;
  when the photovoltaic inverter is in the grid connected state and the interphase imbalance occurs between the output phases, if the interphase states of the output phases of the photovoltaic inverter switch from the interphase imbalance to the interphase balance, the switching circuit is controlled to be disconnected from being closed, and the modulation control separately performed on the output phases is switched to the modulation control performed on the output phases as a whole;

when the photovoltaic inverter is in the grid connected state and the interphase imbalance occurs between the output phases, if the photovoltaic inverter switches from the grid connected state to the off-grid state, the switching circuit keeps closed, and the modulation control is still separately performed on the output phases;

when the photovoltaic inverter is in the off-grid state, if the photovoltaic inverter switches from the off-grid state to the grid connected state and the interphase balance is achieved between the output phases, the switching circuit is controlled to be disconnected from being closed, and the modulation control separately performed on the output phases is switched to the modulation control performed on the output phases as a whole; or when the photovoltaic inverter is in the off-grid state, if the photovoltaic inverter switches from the off-grid state to the grid connected state and the interphase balance is achieved between the output phases, the switching circuit keeps closed, and the modulation control is still separately performed on the output phases.

Optionally, the modulation control performed on the output phases as a whole is achieved through SPWM or common-mode voltage injection modulation; and the modulation control separately performed on the output phases is achieved through the SPWM.

Optionally, whether the output phases of the photovoltaic inverter in the grid connected state are balanced is determined based on a difference between electrical signals of the phases; and if a difference between a maximum phase and a minimum phase of an electrical signal in the electrical signals of the phases exceeds a preset interphase threshold, it is determined that the output phases are in an interphase imbalanced state; otherwise, the output phases are in an interphase balanced state.

Optionally, the photovoltaic inverter further includes:

a voltage divider component electrically connected to the switching circuit.

Optionally, the voltage divider component includes a first resistor, and the first resistor and the switching circuit are connected in series between the neutral wire and the user side.

Optionally, the voltage divider component includes a first capacitor, and the first capacitor and the switching circuit are connected in parallel between the neutral wire and the user side.

Optionally, the first capacitor is connected in parallel to all switches in the switching circuit; or the first capacitor is connected in parallel to some switches in the switching circuit.

Optionally, the voltage divider component includes a second resistor and a second capacitor; and the second resistor and the second capacitor are connected in series, and between. neutral wire and the user side, the second resistor and the second capacitor are connected in parallel to the switching circuit as a whole.

Optionally, the second resistor and the second capacitor are connected in parallel to all switches in the switching circuit as a whole; or the second resistor and the second capacitor are connected in parallel to some switches in the switching circuit as a whole.

Optionally, the voltage divider component includes a third resistor and a third capacitor; and the third resistor and the switching circuit are connected in series between the neutral wire and the user side, and the third capacitor and the switching circuit are connected in parallel between the neutral wire and the user side.

Optionally, the third capacitor is connected in parallel to all switches in the switching circuit; or the third capacitor is connected in parallel to some switches in the switching circuit.

Optionally, the voltage divider component includes a capacitor and/or a resistor, the capacitor is a thin-film capacitor, and the resistor is a power resistor.

Optionally, the any one of the A-phase bridge arm, the B-phase bridge arm, and the C-phase bridge arm includes a first switching transistor and a second switching transistor; and the freewheeling branch electrically connected to the midpoint of the any one of the A-phase bridge arm, the B-phase bridge arm, and the C-phase bridge arm includes a third switching transistor and a fourth switching transistor, where a first terminal of the first switching transistor is electrically connected to a positive terminal, a second terminal of the first switching transistor is electrically connected to the midpoint, a first terminal of the second switching transistor is electrically connected to the midpoint, and a second terminal of the second switching transistor is electrically connected to a negative terminal;

a first terminal of the third switching transistor is electrically connected to the midpoint, a second terminal of the third switching transistor is electrically connected to a first terminal of the fourth switching transistor, and a second terminal of the fourth switching transistor is electrically connected to the neutral wire; and control terminals of the first switching transistor, the second switching transistor, the third switching transistor, and the fourth switching transistor are all electrically connected to a pulse modulation circuit.

Optionally, at least one of the first switching transistor, the second switching transistor, the third switching transistor, and the fourth switching transistor is an insulated-gate bipolar transistor (IGBT).

Correspondingly, the present disclosure further provides a control method of a photovoltaic inverter, where the control method is used to control the above photovoltaic inverter, and includes:

controlling the switching circuit to be in a turned-on state from a closed state, so as to control the photovoltaic inverter to switch from SPWM to common-mode voltage injection modulation.

Compared with the prior art, the technical solutions provided in the present disclosure at least have the following advantages:

The present disclosure provides a photovoltaic inverter and a control method thereof. The photovoltaic inverter includes: a three-phase bridge arm, including an A-phase bridge arm, a B-phase bridge arm, and a C-phase bridge arm, where a midpoint of the A-phase bridge arm is electrically connected to an A-phase line, a midpoint of the B-phase bridge arm is electrically connected to a B-phase line, a midpoint of the C-phase bridge arm is electrically connected to a C-phase line, and a midpoint of any one of the A-phase bridge arm, the B-phase bridge arm, and the C-phase bridge arm is also electrically connected to a neutral wire through a freewheeling branch, where the midpoint of the any one of the A-phase bridge arm, the B-phase bridge arm, and the C-phase bridge arm is a connection point between an upper bridge arm and a lower bridge arm; and a switching circuit electrically connected between the neutral wire and a user side, where the switching circuit is configured to block a current loop of the neutral wire in response to control.

As can be seen from the above content, according to the technical solutions provided in the present disclosure, the current loop of the neutral wire is connected or blocked through the switching circuit, such that an SPWM mode and a common-mode voltage injection modulation mode of the photovoltaic inverter can be flexibly switched. In this way, the photovoltaic inverter can reduce a switching loss and improve its efficiency in the common-mode voltage injection modulation mode.

BRIEF DESCRIPTION OF THE DRAWINGS

To describe the technical solutions in the embodiments of the present disclosure or in the prior art more clearly, the accompanying drawings required for describing the embodiments or the prior art will be briefly described below. Apparently, the accompanying drawings in the following description merely show the embodiments of the present disclosure, and those of ordinary skill in the art can still derive other drawings from the provided drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All the other embodiments derived by those of ordinary skill in the art based on the embodiments of the present disclosure without creative efforts shall fall within the protection scope of the present disclosure.

As described in BACKGROUND, in the field of solar power generation, a photovoltaic inverter, as a core device, inverts AC electric energy generated by a solar panel into AC electric energy that is consistent with a grid in the system, and merges the AC electric energy into the grid. The photovoltaic inverter is not only a power generation device, but also very important electrical equipment in an electrical system. For safety reasons, most of current power supply systems are TN-S electrical systems, which require discrete neutral and ground wires on a user side. Non-current-carrying parts such as a housing of the electrical equipment must be reliably grounded to avoid a hidden electrical accident. From a perspective of electrical safety, the photovoltaic inverter also needs to adopt a three-phase four-wire system for wiring. However, an existing photovoltaic inverter adopting the three-phase four-wire system can only use SPWM control during voltage modulation, which is not conducive to improving efficiency of the photovoltaic inverter.

Based on this, the embodiments of the present disclosure provide a photovoltaic inverter and a control method thereof, which effectively solve existing technical problems. A current loop of a neutral wire is connected or blocked through a switching circuit, such that an SPWM mode and a common-mode voltage injection modulation mode of the photovoltaic inverter can be flexibly switched. In this way, the photovoltaic inverter can reduce a switching loss and improve its efficiency in the common-mode voltage injection modulation mode.

To achieve the foregoing objective, the following are technical solutions provided in the embodiments of the present disclosure. Specifically, the technical solutions provided in the embodiments of the present disclosure are described in detail with reference to FIG. 1 to FIG. 10.

Figure 1:
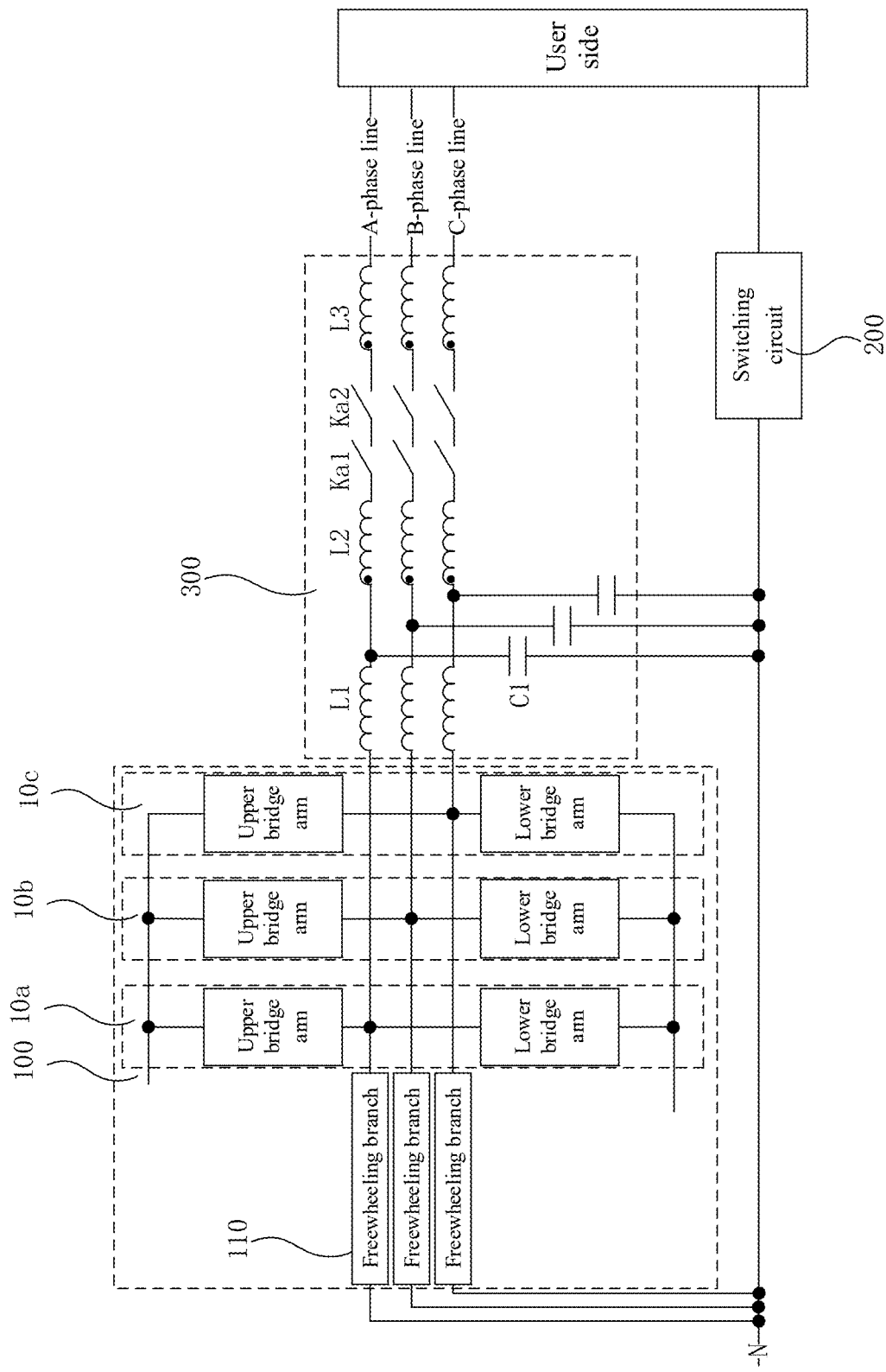
FIG. 1 is a schematic structural diagram of a photovoltaic inverter according to an embodiment of the present disclosure.

FIG. 1 is a schematic structural diagram of a photovoltaic inverter according to an embodiment of the present disclosure. The photovoltaic inverter includes three-phase bridge arm 100 and switching circuit 200.

The three-phase bridge arm 100 includes A-phase bridge arm 10a, B-phase bridge arm 10b, and C-phase bridge arm 10c. A midpoint of the A-phase bridge arm 10a is electrically connected to an A-phase line, a midpoint of the B-phase bridge arm 10b is electrically connected to a B-phase line, and a midpoint of the C-phase bridge arm 10c is electrically connected to a C-phase line. A midpoint of any one of the A-phase bridge arm 10a, the B-phase bridge arm 10b, and the C-phase bridge arm 10c is also electrically connected to neutral wire N through freewheeling branch 110. The midpoint of the any one of the A-phase bridge arm 10a, the B-phase bridge arm 10b, and the C-phase bridge arm 10c is a connection point between an upper bridge arm and a lower bridge arm. The switching circuit 200 is electrically connected between the neutral wire N and a user side. The switching circuit 200 is configured to block a current loop of the neutral wire N in response to control.

Still referring to FIG. 1, the photovoltaic inverter provided in this embodiment of the present disclosure further includes filtering circuit 300 electrically connected between the three-phase bridge arm 100 and the user side. The filtering circuit 300 includes filtering branches that are electrically connected to the A-phase line, the B-phase line, and the C-phase line respectively. The filtering branch includes filtering inductor L1, filtering capacitor C, first common mode inductor L2, first connection switch Ka1, second connection switch Ka2, and second common mode inductor L3. A first terminal of the filtering inductor L1 is electrically connected to a phase line, a second terminal of the filtering inductor L1 is electrically connected to a first polar plate of the filtering capacitor C and a first terminal of the first common mode inductor L2, a second polar plate of the filtering capacitor C is electrically connected to the neutral wire N, and a position where the filtering capacitor C is electrically connected to the neutral wire N is on a side of the switching circuit 200 away from the user side. A second terminal of the second common mode inductor L2 is electrically connected to a first terminal of the first connection switch Ka1, a second terminal of the first connection switch Ka1 is electrically connected to a first terminal of the second connection switch Ka2, a second terminal of the second connection switch Ka2 is electrically connected to a first terminal of the second common mode inductor L3, and a second terminal of the second common mode inductor L3 is connected to the user side. The filtering branch provided in this embodiment of the present disclosure includes two connection switches, namely the first connection switch Ka1 and the second connection switch Ka2, which conform to a redundancy design mode and improve reliability of the photovoltaic inverter.

It can be understood that the technical solution provided in this embodiment of the present disclosure blocks the current loop of the neutral wire N through the switching circuit 200. Therefore, there is no need to control a switching transistor connected to the neutral wire N, in other words, the switching transistor connected to the neutral wire N will be in a disconnected state. This reduces a quantity of switching transistors that need to be controlled during voltage modulation, thereby achieving a goal of switching an SPWM mode to a common-mode voltage injection modulation mode. Therefore, the current loop of the neutral wire N is connected or blocked through the switching circuit 200, such that the SPWM mode and the common-mode voltage injection modulation mode of the photovoltaic inverter can be flexibly switched. In this way, the photovoltaic inverter can reduce a switching loss and improve its efficiency in the common-mode voltage injection modulation mode.

Figure 2:
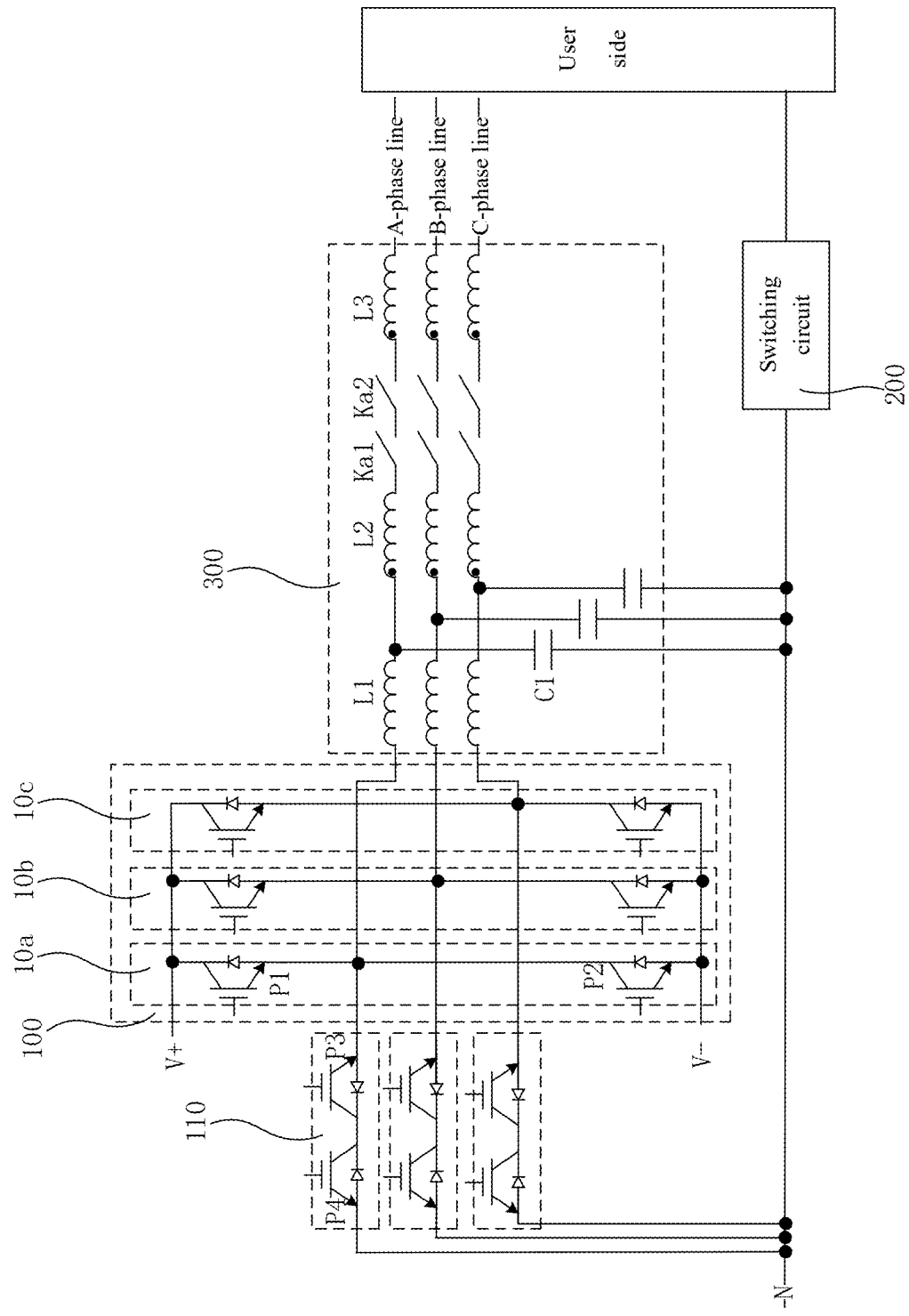
FIG. 2 is a schematic structural diagram of another photovoltaic inverter according to an embodiment of the present disclosure.

FIG. 2 is a schematic structural diagram of another photovoltaic inverter according to an embodiment of the present disclosure. The any one of the A-phase bridge arm 10a, the B-phase bridge arm 10b, and the C-phase bridge arm 10c includes first switching transistor P1 and second switching transistor P2. The freewheeling branch 110 electrically connected to the midpoint of the any one of the A-phase bridge arm 10a, the B-phase bridge arm 10b, and the C-phase bridge arm 10c includes third switching transistor P3 and fourth switching transistor P4.

A first terminal of the first switching transistor P1 is electrically connected to positive terminal V+, a second terminal of the first switching transistor P1 is electrically connected to the midpoint, a first terminal of the second switching transistor P2 is electrically connected to the midpoint, and a second terminal of the second switching transistor P2 is electrically connected to negative terminal V−. A first terminal of the third switching transistor P3 is electrically connected to the midpoint, a second terminal of the third switching transistor P3 is electrically connected to a first terminal of the fourth switching transistor P4, and a second terminal of the fourth switching transistor P4 is electrically connected to the neutral wire N. Control terminals of the first switching transistor P1, the second switching transistor P2, the third switching transistor P3, and the fourth switching transistor P4 are all electrically connected to a pulse modulation circuit (not shown).

It should be noted that, as shown in FIG. 2, a quantity and a connection relationship of the switching transistors included in the bridge arm of each phase, as well as a quantity and a connection relationship of the switching transistors included in the freewheeling branch are only one of structures applicable to the technical solutions of the present disclosure. In other embodiments of the present disclosure, the bridge arm and the freewheeling branch 110 provided in the present disclosure can also be connected in other ways, which is not specifically limited in the present disclosure.

In an embodiment of the present disclosure, at least one of the first switching transistor P1, the second switching transistor P2, the third switching transistor P3, and the fourth switching transistor P4 provided in this embodiment of the present disclosure is an IGBT.

Figure 3:
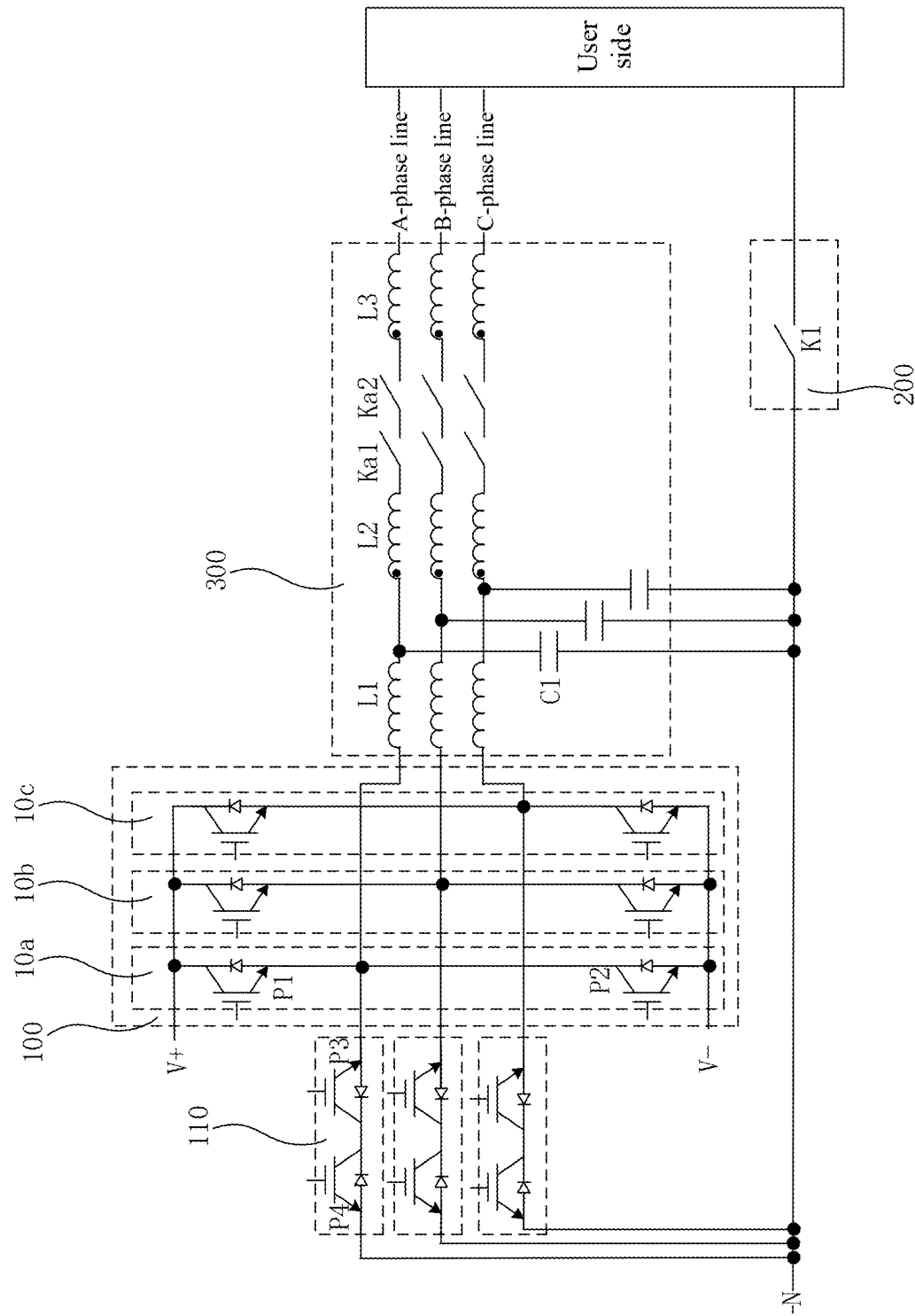
FIG. 3 is a schematic structural diagram of still another photovoltaic inverter according to an embodiment of the present disclosure.

The switching circuit provided in this embodiment of the present disclosure is described in detail below with reference to the accompanying drawings. FIG. 3 is a schematic structural diagram of still another photovoltaic inverter according to an embodiment of the present disclosure. The freewheeling branch 110 is electrically connected to a grid connected end of the neutral wire N. The switching circuit 200 includes first switch K1. A first terminal of the first switch K1 is electrically connected to the grid connected end, and a second terminal of the first switch K1 is electrically connected to the user side.

It can be understood that in the technical solutions provided in this embodiment of the present disclosure, when common-mode voltage injection modulation is required for the photovoltaic inverter, the current loop of the neutral wire N is blocked through the first switch K1, which is equivalent to disconnecting the current loop between the neutral wire N and the freewheeling branch 110. Therefore, when the voltage modulation is performed on the photovoltaic inverter, there is no need to control the third switching transistor P3 and the fourth switching transistor P4, and only the first switching transistor P1 and the second switching transistor P2 need to be controlled for the bridge arm of each phase. This reduces the quantity of switching transistors that need to be controlled during the modulation and achieves the common-mode voltage injection modulation.

The first switch K1 may be configured as a switching device supporting a voltage difference/current on/off to support online switching between working modes of the inverter. The first switch K1 may be configured as a solid-state relay supporting a voltage difference or a current on/off capability to implement online switching. Therefore, on/off of the switching circuit is controlled online. Common solid-state relay types include an optical relay or a photoelectric relay, or an isolated switching transistor and an isolated switch driver that have capacitive or inductive isolation.

The photovoltaic inverter in this embodiment controls the on/off of the switching circuit based on a working state of the photovoltaic inverter and interphase states of various output phases.

If the photovoltaic inverter is in a grid connected state and an interphase balance is achieved between the output phases, the switching circuit is controlled to be disconnected, and modulation control is performed on the output phases as a whole.

If the photovoltaic inverter is in the grid connected state and an interphase imbalance occurs between the output phases, the switching circuit is controlled to be closed, and the modulation control is separately performed on the output phases.

If the photovoltaic inverter is in an off-grid state, the switching circuit is controlled to be closed, and the modulation control is separately performed on the output phases.

Optionally, when the photovoltaic inverter is in the grid connected state and the interphase balance is achieved between the output phases, if the interphase states of the output phases of the photovoltaic inverter switch from the interphase balance to the interphase imbalance, the switching circuit is controlled to be closed from being disconnected, and the modulation control performed on the output phases as a whole is switched to the modulation control separately performed on the output phases.

When the photovoltaic inverter is in the grid connected state and the interphase balance is achieved between the output phases, if the photovoltaic inverter switches from the grid connected state to the off-grid state, the switching circuit is controlled to be closed from being disconnected, and the modulation control performed on the output phases as a whole is switched to the modulation control separately performed on the output phases.

When the photovoltaic inverter is in the grid connected state and the interphase imbalance occurs between the output phases, if the interphase states of the output phases of the photovoltaic inverter switch from the interphase imbalance to the interphase balance, the switching circuit is controlled to be disconnected from being closed, and the modulation control separately performed on the output phases is switched to the modulation control performed on the output phases as a whole.

When the photovoltaic inverter is in the grid connected state and the interphase imbalance occurs between the output phases, if the photovoltaic inverter switches from the grid connected state to the off-grid state, the switching circuit keeps closed, and the modulation control is still separately performed on the output phases.

When the photovoltaic inverter is in the off-grid state, if the photovoltaic inverter switches from the off-grid state to the grid connected state and the interphase balance is achieved between the output phases, the switching circuit is controlled to be disconnected from being closed, and the modulation control separately performed on the output phases is switched to the modulation control performed on the output phases as a whole.

When the photovoltaic inverter is in the off-grid state, if the photovoltaic inverter switches from the off-grid state to the grid connected state and the interphase balance is achieved between the output phases, the switching circuit keeps closed, and the modulation control is still separately performed on the output phases.

The above determining the interphase state is to determine, based on a difference between electrical signals of the phases, whether the output phases of the photovoltaic inverter in the grid connected state are balanced. If a difference between a maximum phase and a minimum phase of an electrical signal in the electrical signals of the phases exceeds a preset interphase threshold, it is determined that the output phases are in an interphase imbalanced state; otherwise, the output phases are in an interphase balanced state.

When the first switch K1 in the switching circuit is closed from being disconnected, the first switch K1 is closed when it is determined that a voltage difference on two sides of the first switch K1 is less than a specified voltage threshold. When the voltage difference on the two sides of the first switch K1 is greater than the specified voltage threshold, outputs of the phases are first controlled to achieve an output balance, and then the first switch K1 is closed when the voltage difference on the two sides of the first switch K1 is less than the specified voltage threshold. When the first switch K1 is disconnected from being closed, the first switch K1 is disconnected when it is determined that a current on the first switch K1 is less than a specified current threshold. When the current on the first switch K1 is greater than the specified current threshold, the outputs of the phases are first controlled to achieve the output balance, and then the first switch K1 is disconnected when the current on the first switch K1 is less than the specified current threshold. This design logic can ensure that the first switch K1 works safely during state switching, avoiding an electric arc to damage a relay body or other electrical equipment.

When the first switch K1 in the switching circuit is configured as the solid-state relay, because the solid-state relay supports the voltage difference/the current on/off capability, there is no need to determine the voltage difference on the two sides of the first switch K1 or the current passing through the first switch K1 when the first switch K1 is closed or disconnected. When the solid-state relay is controlled to be closed from being disconnected, the solid-state relay is directly closed, without determining the voltage difference on the two sides of the solid-state relay. When the solid-state relay is disconnected from being closed, the solid-state relay is directly disconnected, without determining a magnitude of the current on the solid-state relay.

In addition, the modulation control performed on the output phases as a whole is achieved through the SPWM or the common-mode voltage injection modulation. The modulation control separately performed on the output phases is achieved through the SPWM.

Taking a two-phase inverter and a three-phase inverter as examples, the following describes a process of selecting and controlling a modulation mode based on different working states of the inverter.

For the two-phase inverter, when the two-phase inverter works in the grid connected state and outputs of two phases are balanced, the solid-state relay (the first switch K1) is controlled to be disconnected, the two phases are controlled as a whole, and the SPWM or the common-mode voltage injection modulation can be used to improve efficiency. When the two-phase inverter works in the grid connected state and the outputs of the two phases are imbalanced, or when the inverter works in the off-grid state (without distinguishing whether the outputs are balanced in the off-grid state), the solid-state relay (the first switch K1) is controlled to be closed, the two phases are controlled separately, and the SPWM is used.

For the three-phase-phase inverter, when the three-phase inverter works in the grid connected state and outputs of three phases are balanced, the solid-state relay (the first switch K1) is controlled to be disconnected, the three phases are controlled as a whole, and the SPWM or the common-mode voltage injection modulation can be used to improve efficiency. When the three-phase inverter works in the grid connected state and the outputs of the three phases are imbalanced, or when the inverter works in the off-grid state (without distinguishing whether the outputs are balanced in the off-grid state), the solid-state relay (the first switch K1) is controlled to be closed, the three phases are controlled separately, and the SPWM is used.

In addition, for the three-phase inverter, strategy logic used by the solid-state relay (namely, the first switch K1) to online switch the closed and disconnected states and control and adjust the modulation mode is as follows:

a. When an initial state of the three-phase inverter is the grid connected state and the outputs of the three phases are balanced, the solid-state relay (namely, the first switch K1) is disconnected, and a dq control mode is used to perform voltage control based on the SPWM or the common-mode voltage injection modulation. When it is recognized that the outputs of the three phases are imbalanced, the solid-state relay (namely, the first switch K1) is closed, each phase is separately controlled, and the voltage control is performed based on the SPWM.

b. When the initial state of the three-phase inverter is the grid connected state and the outputs of the three phases are balanced, the solid-state relay (namely, the first switch K1) is disconnected, and the dq control mode is used to perform the voltage control based on the SPWM or the common-mode voltage injection modulation. After the off-grid state is entered, the solid-state relay (namely, the first switch K1) is closed, each phase is separately controlled, and the voltage control is performed based on the SPWM.

c. When the initial state of the three-phase inverter is the grid connected state and the outputs of the three phases are imbalanced, the solid-state relay (namely, the first switch K1) is closed, each phase is separately controlled, and the voltage control is performed based on the SPWM. When it is recognized that the outputs of the three phases are balanced, the solid-state relay (namely, the first switch K1) is disconnected, the dq control mode is adopted, and the voltage control is performed based on the SPWM or the common-mode voltage injection modulation.

d. When the initial state of the three-phase inverter is the grid connected state and the outputs of the three phases are imbalanced, the solid-state relay (namely, the first switch K1) is closed, each phase is separately controlled, and the voltage control based on the SPWM. After the off-grid state is entered, each phase is separately controlled, and the voltage control is performed still based on the SPWM.

e. When the initial state of the three-phase inverter is the off-grid state, the solid-state relay (namely, the first switch K1) is closed, each phase is separately controlled, and the voltage control is performed based on the SPWM. After the grid connected state is entered and the outputs are balanced, the solid-state relay (namely, the first switch K1) is disconnected, the dq control mode is adopted, and the voltage control is performed based on the SPWM or the common-mode voltage injection modulation.

f. When the initial state of the three-phase inverter is the off-grid state, the solid-state relay (namely, the first switch K1) is closed, each phase is separately controlled, and the voltage control is performed based on the SPWM. After the grid connected state is entered and the outputs are imbalanced, each phase is separately controlled, and the voltage control is still performed based on the SPWM.

Figure 4:
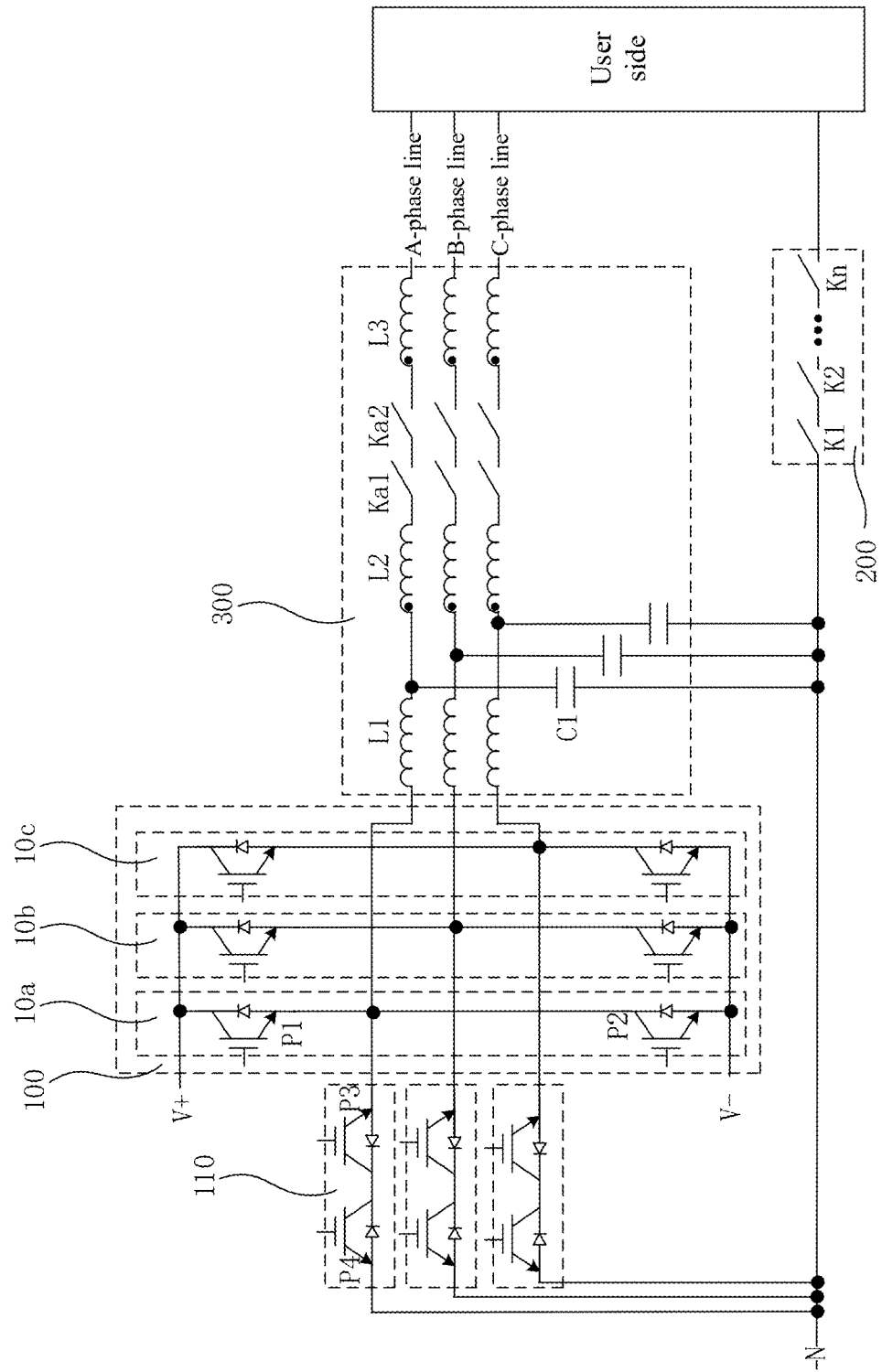
FIG. 4 is a schematic structural diagram of still another photovoltaic inverter according to an embodiment of the present disclosure.

Further, in order to improve the reliability of the photovoltaic inverter, the switching circuit provided in this embodiment of the present disclosure may further include more switches, such that the switching circuit conforms to a redundancy design. FIG. 4 is a schematic structural diagram of still another photovoltaic inverter according to an embodiment of the present disclosure. The switching circuit 200 provided in this embodiment of the present disclosure further includes second switch K2 to $N^{th}$ switch Kn, where N is an integer greater than or equal to 2. At least two of the first switch K1 to the $N^{th}$ switch Kn are connected in series with each other.

In any one of the above embodiments of the present disclosure, any one of the first switch K1 to the $N^{th}$ switch Kn provided in this embodiment of the present disclosure is an electromagnetic relay, a DC/AC contactor, or a semiconductor switching device. In other embodiments of the present disclosure, the first switch K1 to the $N^{th}$ switch Kn may also be other types of switches, which is not specifically limited in the present disclosure.

Figure 5:
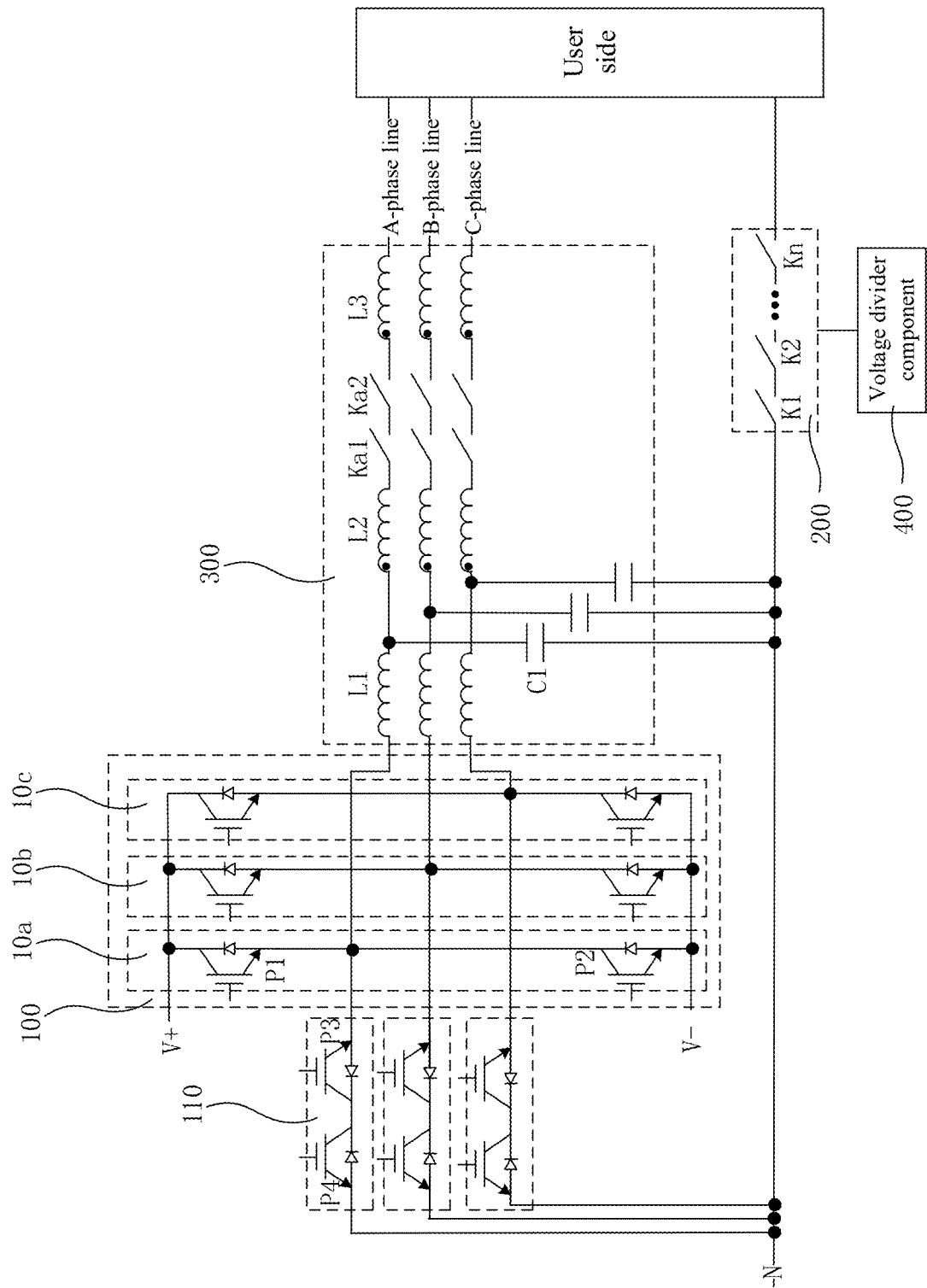
FIG. 5 is a schematic structural diagram of still another photovoltaic inverter according to an embodiment of the present disclosure.

FIG. 5 is a schematic structural diagram of still another photovoltaic inverter according to an embodiment of the present disclosure. The photovoltaic inverter provided in this embodiment of the present disclosure further includes voltage divider component 400 electrically connected to the switching circuit 200. The voltage divider component 400 provided in this embodiment of the present disclosure is configured to perform dynamic voltage division, thereby providing a condition for smoothly completing the common-mode voltage injection modulation when the photovoltaic inverter switches from the SPWM mode to the common-mode voltage injection modulation mode.

Figure 6:
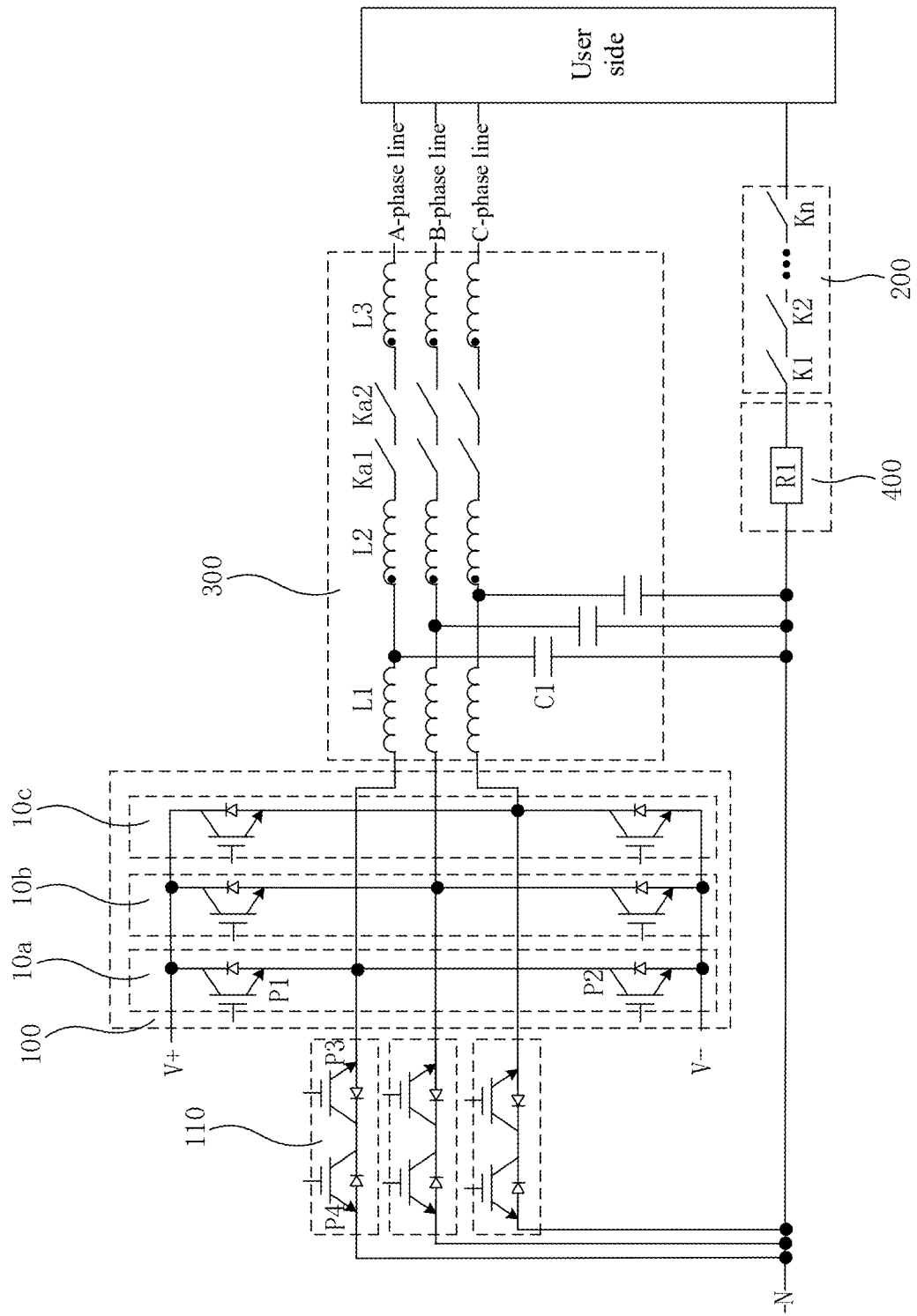
FIG. 6 is a schematic structural diagram of still another photovoltaic inverter according to an embodiment of the present disclosure.

In an embodiment of the present disclosure, the voltage divider component provided in this embodiment of the present disclosure may be a single component such as a resistor or a capacitor, or a combination of a plurality of components. FIG. 6 is a schematic structural diagram of still another photovoltaic inverter according to an embodiment of the present disclosure. The voltage divider component 400 provided in this embodiment of the present disclosure includes first resistor R1. The first resistor R1 and the switching circuit 200 are connected in series between the neutral wire N and the user side.

Figure 7:
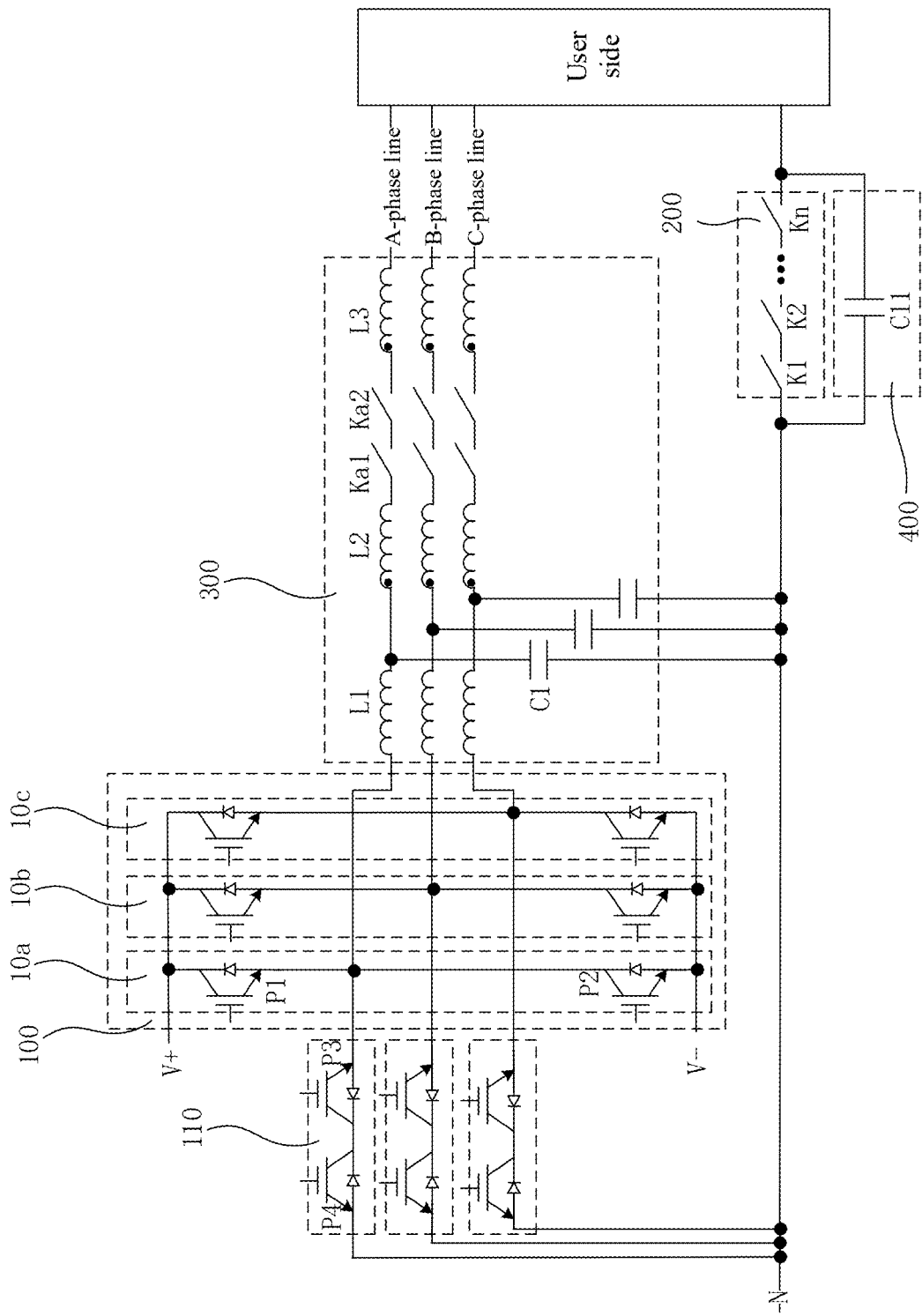
FIG. 7 is a schematic structural diagram of still another photovoltaic inverter according to an embodiment of the present disclosure.

Alternatively, FIG. 7 is a schematic structural diagram of still another photovoltaic inverter according to an embodiment of the present disclosure. The voltage divider component 400 provided in this embodiment of the present disclosure includes first capacitor C11. The first capacitor C11 and the switching circuit 200 are connected in parallel between the neutral wire N and the user side. Optionally, the first capacitor C11 is connected in parallel to all switches in the switching circuit 200; or the first capacitor C11 is connected in parallel to some switches in the switching circuit 200. This needs to be specifically designed based on an actual application.

Figure 8:
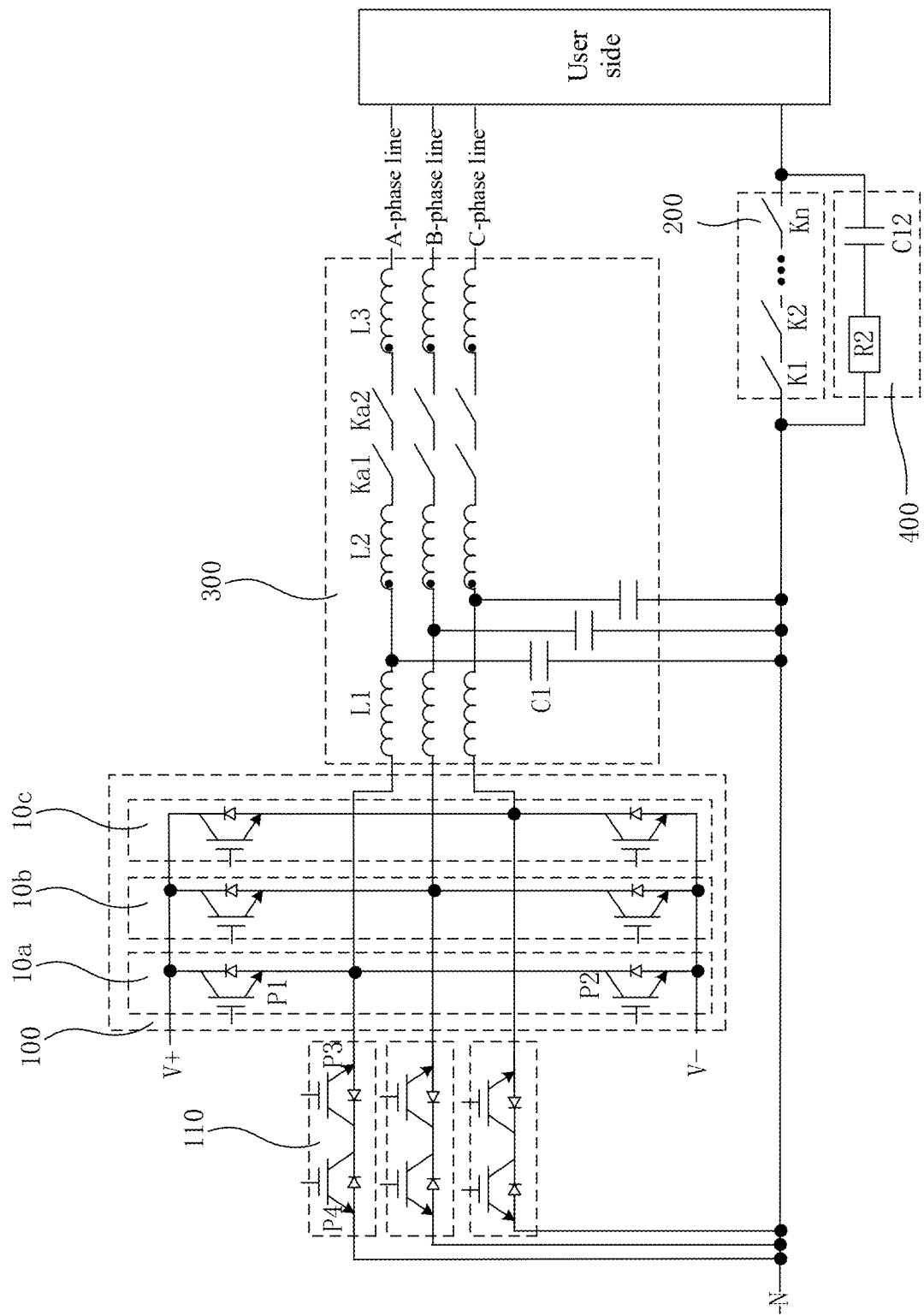
FIG. 8 is a schematic structural diagram of still another photovoltaic inverter according to an embodiment of the present disclosure.

The voltage divider component provided in this embodiment of the present disclosure may also be a combination of a resistor and a capacitor. FIG. 8 is a schematic structural diagram of still another photovoltaic inverter according to an embodiment of the present disclosure. The voltage divider component 400 provided in this embodiment of the present disclosure includes second resistor R2 and second capacitor C12. The second resistor R2 and the second capacitor C12 are connected in series, and between the neutral wire N and the user side, the second resistor R2 and the second capacitor C12 are connected in parallel to the switching circuit 200 as a whole. Optionally, the second resistor R2 and the second capacitor C12 provided in this embodiment of the present disclosure are connected in parallel to all switches in the switching circuit 200 as a whole; or the second resistor R2 and the second capacitor C12 are connected in parallel to some switches in the switching circuit 200. This needs to be specifically designed based on an actual application.

Figure 9:
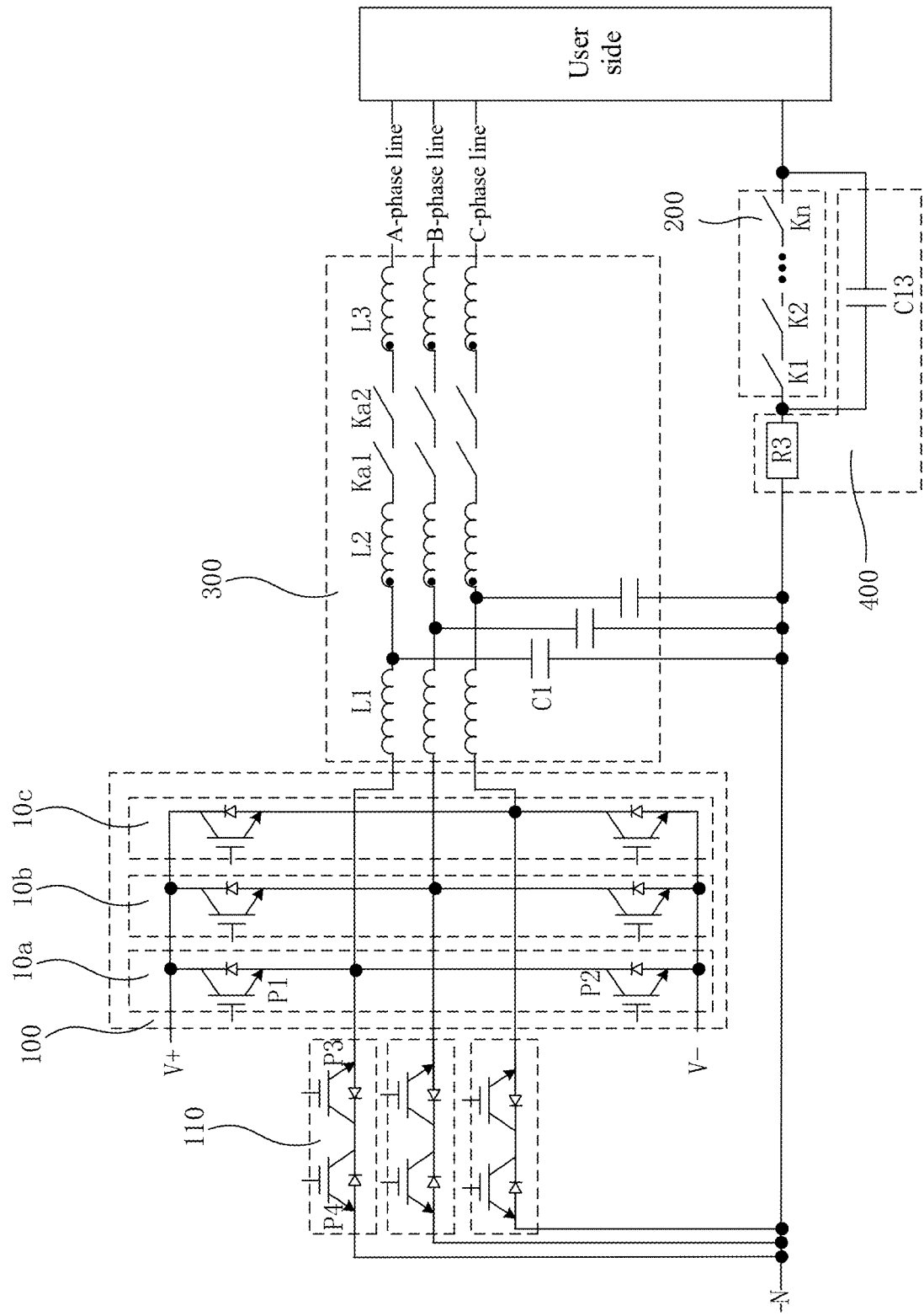
FIG. 9 is a schematic structural diagram of still another photovoltaic inverter according to an embodiment of the present disclosure.

FIG. 9 is a schematic structural diagram of still another photovoltaic inverter according to an embodiment of the present disclosure. The voltage divider component 400 provided in this embodiment of the present disclosure includes third resistor R3 and third capacitor C13. The third resistor R3 and the switching circuit 200 are connected in series between the neutral wire N and the user side. The third capacitor C13 and the switching circuit 200 are connected in parallel between the neutral wire N and the user side. Optionally, the third capacitor C13 provided in this embodiment of the present disclosure is connected in parallel to all switches in the switching circuit 200; or the third capacitor C13 is connected in parallel to some switches in the switching circuit 200.

It should be noted that the resistor in the voltage divider component provided in the embodiments of the present disclosure may be a single resistor element, or a combination structure of some resistor elements connected in series and/or in parallel in a plurality of resistor elements. This is not specifically limited in the present disclosure. Similarly, the voltage divider component provided in the embodiments of the present disclosure may be a single capacitor element, or a combination structure of some capacitor elements connected in series and/or in parallel in a plurality of capacitor elements.

In any one of the above embodiments of the present disclosure, the voltage divider component provided in the present disclosure includes a capacitor and/or a resistor. The capacitor is a thin-film capacitor, and the resistor is a power resistor. In other embodiments of the present disclosure, the capacitor and the resistor in the voltage divider component provided in the present disclosure may also be of other types, which is not specifically limited in the present disclosure.

Figure 10:
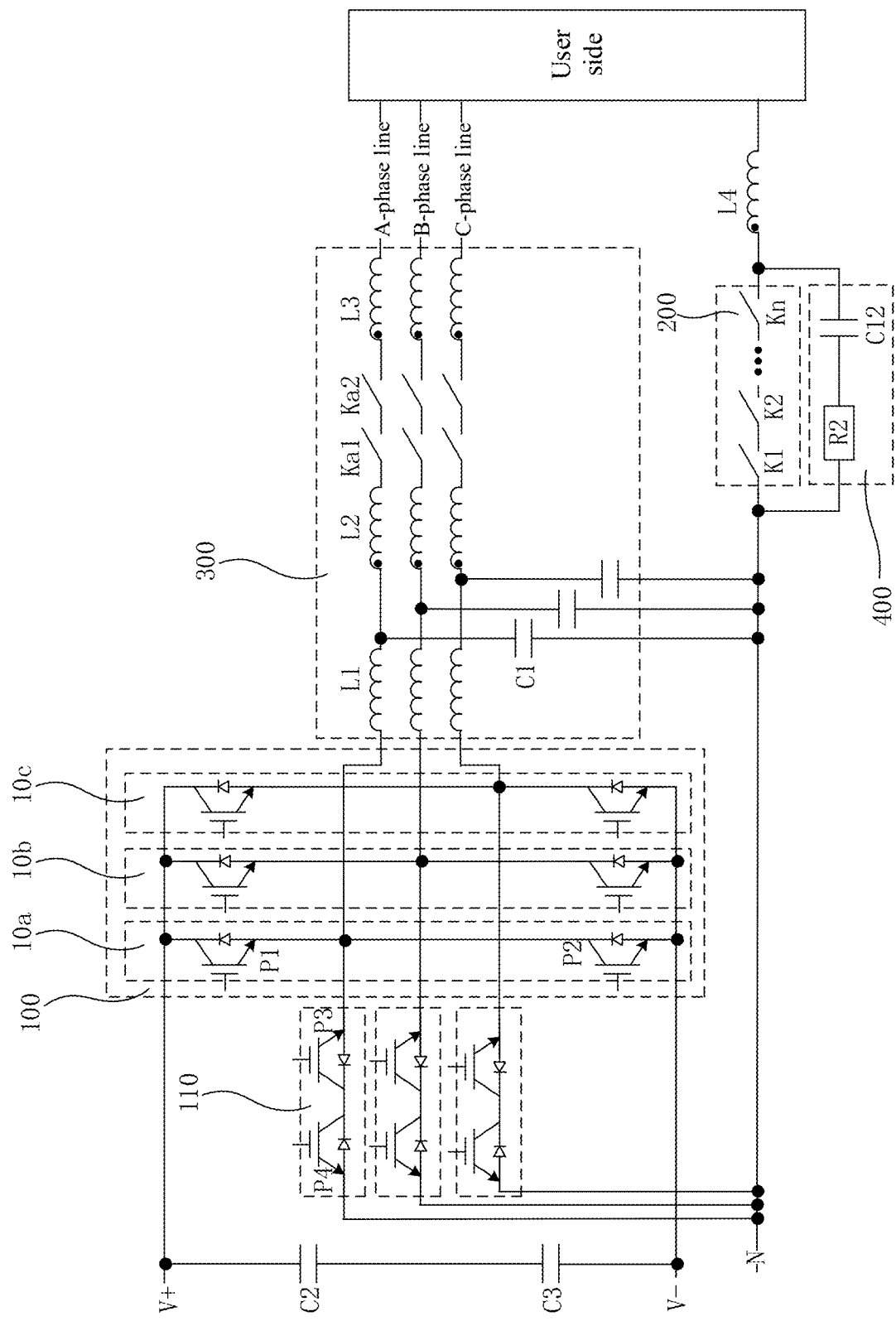
FIG. 10 is a schematic structural diagram of still another photovoltaic inverter according to an embodiment of the present disclosure.

FIG. 10 is a schematic structural diagram of still another photovoltaic inverter according to an embodiment of the present disclosure. The photovoltaic inverter provided in this embodiment of the present disclosure may further include two capacitors C2 and C3 that are electrically connected between the positive terminal V+ and the negative terminal V−, and third common-mode inductor L4 electrically connected between the switching circuit 200 and the user side. In addition, the photovoltaic inverter provided in the embodiments of the present disclosure may also include more components that optimize performance of the inverter, which is not specifically limited in the present disclosure.

Correspondingly, the embodiments of the present disclosure further provide a control method of a photovoltaic inverter. The control method is used to control the photovoltaic inverter in any one of the above embodiments, and includes:

controlling the switching circuit to be in a turned-on state from a closed state, so as to control the photovoltaic inverter to switch from SPWM to common-mode voltage injection modulation.

It should be noted that the SPWM provided in the embodiments of the present disclosure is seven-segment modulation control, and the common-mode voltage injection modulation is five-segment modulation control, which are the same as existing modulation control principles. Therefore, details are not described herein again.

The embodiments of the present disclosure provide a photovoltaic inverter and a control method thereof. The photovoltaic inverter includes: a three-phase bridge arm, including an A-phase bridge arm, a B-phase bridge arm, and a C-phase bridge arm, where a midpoint of the A-phase bridge arm is electrically connected to an A-phase line, a midpoint of the B-phase bridge arm is electrically connected to a B-phase line, a midpoint of the C-phase bridge arm is electrically connected to a C-phase line, and a midpoint of any one of the A-phase bridge arm, the B-phase bridge arm, and the C-phase bridge arm is also electrically connected to a neutral wire through a freewheeling branch, where the midpoint of the any one of the A-phase bridge arm, the B-phase bridge arm, and the C-phase bridge arm is a connection point between an upper bridge arm and a lower bridge arm; and a switching circuit electrically connected between the neutral wire and a user side, where the switching circuit is configured to block a current loop of the neutral wire in response to control.

As can be seen from the above content, according to the technical solutions provided in the embodiments of the present disclosure, the current loop of the neutral wire is connected or blocked through the switching circuit, such that an SPWM mode and a common-mode voltage injection modulation mode of the photovoltaic inverter can be flexibly switched. In this way, the photovoltaic inverter can reduce a switching loss and improve its efficiency in the common-mode voltage injection modulation mode.

It should be understood that, in the description of the present disclosure, orientations or position relationships indicated by terms such as "central", "longitudinal", "transverse", "long", "wide", "thick", "upper", "lower", "front", "back", "left", "right", "vertical", "horizontal", "top", "bottom", "inner", "outer", "clockwise", "anticlockwise", "axial", "radial", and "circumferential" are based on the orientations or position relationships shown in the accompanying drawings. These terms are merely intended to facilitate the description of the present disclosure and simplify the description, but not to indicate or imply that the mentioned device or elements must have a specific orientation and must be established or be operated in a specific orientation, and thus these terms cannot be understood as a limitation to the present disclosure.

Moreover, terms such as "first" and "second" are used only for the purpose of description and cannot be understood as indicating or implying relative importance or implicitly indicating a quantity of indicated technical features. Therefore, features defined by "first" and "second" may explicitly or implicitly include at least one of the features. In the description of the present disclosure, "a plurality of" means at least two, for example, two or three, unless otherwise specifically limited.

In the present disclosure, unless otherwise clearly specified and limited, the terms such as "installation", "interconnection", "connection" and "fixation" are intended to be understood in a broad sense. For example, the "connection" may be a fixed connection, a removable connection, or an integral connection; may be a mechanical connection, an electrical connection or a communication connection; may be a direct connection or an indirect connection using a medium; and may be a communication or an interaction between two elements. Those of ordinary skill in the art may understand specific meanings of the above terms in the present disclosure based on a specific situation.

In the present disclosure, unless otherwise clearly specified and limited, when it is described that a first feature is "above" or "below" a second feature, it indicates that the first and second features are in direct contact or the first and second features are in indirect contact through a medium. In addition, when it is described that the first feature is "over", "above" and "on" the second feature, it indicates that the first feature is directly or obliquely above the second feature, or simply indicates that an altitude of the first feature is higher than that of the second feature. When it is described that the first feature is "under", "below" or "beneath" the second feature, it indicates that the first feature is directly or obliquely under the second feature or simply indicates that an altitude of the first feature is lower than that of the second feature.

In the present disclosure, the terms such as "an embodiment", "some embodiments", "an example", "a specific example", and "some examples" mean that specific features, structures, materials, or characteristics described with reference to the embodiment(s) or example(s) are included in at least one embodiment or example of the present disclosure. In this specification, the schematic expression of the above terms is not necessarily directed to the same embodiment or example. Moreover, the specific features, structures, materials, or characteristics described may be combined in a suitable manner in any one or more embodiments or examples. In addition, those skilled in the art may combine different embodiments or examples described in this specification and characteristics of the different embodiments or examples without mutual contradiction.

Although the embodiments of the present disclosure have been illustrated and described above, it will be appreciated that the above embodiments are illustrative and should not be construed as limitations to the present disclosure. Changes, modifications, substitutions, and variations can be made to the above embodiments by a person of ordinary skill in the art within the scope of the present disclosure.

What is claimed is:

1. A photovoltaic inverter, comprising:
    a three-phase bridge arm, comprising an A-phase bridge arm, a B-phase bridge arm, and a C-phase bridge arm, wherein a midpoint of the A-phase bridge arm is electrically connected to an A-phase line, a midpoint of the B-phase bridge arm is electrically connected to a B-phase line, a midpoint of the C-phase bridge arm is electrically connected to a C-phase line, and the midpoint of any one of the A-phase bridge arm, the B-phase bridge arm, and the C-phase bridge arm is further electrically connected to a neutral wire through a freewheeling branch, wherein the midpoint of the any one of the A-phase bridge arm, the B-phase bridge arm, and the C-phase bridge arm is a connection point between an upper bridge arm and a lower bridge arm; and
    a switching circuit electrically connected between the neutral wire and a user side, wherein the switching circuit is configured to block a current loop of the neutral wire in response to control.

2. The photovoltaic inverter according to claim 1, wherein the freewheeling branch is electrically connected to a grid connected end of the neutral wire; and
    the switching circuit comprises a first switch, wherein a first terminal of the first switch is electrically connected to the grid connected end, and a second terminal of the first switch is electrically connected to the user side.

3. The photovoltaic inverter according to claim 2, wherein the switching circuit further comprises a second switch to an $N^{th}$ switch, wherein N is an integer greater than or equal to 2; and
    at least two of the first switch to the $N^{th}$ switch are connected in series with each other.

4. The photovoltaic inverter according to claim 3, wherein any one of the first switch to the $N^{th}$ switch is an electromagnetic relay, a direct current (DC)/alternating current (AC) contactor, or a semiconductor switching device.

5. The photovoltaic inverter according to claim 4, wherein on/off of the switching circuit is controlled based on a working state of the photovoltaic inverter and interphase states of various output phases; and
    when the photovoltaic inverter is in a grid connected state and an interphase balance is achieved between the output phases, the switching circuit is controlled to be disconnected, and modulation control is performed on the output phases as a whole;
    when the photovoltaic inverter is in the grid connected state and an interphase imbalance occurs between the output phases, the switching circuit is controlled to be closed, and modulation control is separately performed on the output phases; or
    when the photovoltaic inverter is in an off-grid state, the switching circuit is controlled to be closed, and modulation control is separately performed on the output phases.

6. The photovoltaic inverter according to claim 3, wherein on/off of the switching circuit is controlled based on a working state of the photovoltaic inverter and interphase states of various output phases; and
    when the photovoltaic inverter is in a grid connected state and an interphase balance is achieved between the output phases, the switching circuit is controlled to be disconnected, and modulation control is performed on the output phases as a whole;
    when the photovoltaic inverter is in the grid connected state and an interphase imbalance occurs between the output phases, the switching circuit is controlled to be closed, and modulation control is separately performed on the output phases; or
    when the photovoltaic inverter is in an off-grid state, the switching circuit is controlled to be closed, and modulation control is separately performed on the output phases.

7. The photovoltaic inverter according to claim 2, further comprising:
    a voltage divider component electrically connected to the switching circuit, wherein the voltage divider component comprises a first resistor, and the first resistor and the switching circuit are connected in series between the neutral wire and the user side.

8. The photovoltaic inverter according to claim 7, wherein the voltage divider component comprises a first capacitor, and the first capacitor and the switching circuit are connected in parallel between the neutral wire and the user side; and
    the first capacitor is connected in parallel to all switches in the switching circuit; or
    the first capacitor is connected in parallel to some switches in the switching circuit.

9. The photovoltaic inverter according to claim 7, wherein the voltage divider component comprises a second resistor and a second capacitor;
    the second resistor and the second capacitor are connected in series, and between the neutral wire and the user side, the second resistor and the second capacitor are connected in parallel to the switching circuit as a whole; and
    the second resistor and the second capacitor are connected in parallel to all switches in the switching circuit as a whole; or
    the second resistor and the second capacitor are connected in parallel to some switches in the switching circuit as a whole.

10. The photovoltaic inverter according to claim 7, wherein the voltage divider component comprises a third resistor and a third capacitor;

the third resistor and the switching circuit are connected in series between the neutral wire and the user side, and the third capacitor and the switching circuit are connected in parallel between the neutral wire and the user side; and the third capacitor is connected in parallel to all switches in the switching circuit; or the third capacitor is connected in parallel to some switches in the switching circuit.

11. The photovoltaic inverter according to claim 7, wherein the voltage divider component comprises a capacitor and/or a resistor, the capacitor is a thin-film capacitor, and the resistor is a power resistor.

12. The photovoltaic inverter according to claim 2, wherein on/off of the switching circuit is controlled based on a working state of the photovoltaic inverter and interphase states of various output phases; and when the photovoltaic inverter is in a grid connected state and an interphase balance is achieved between the output phases, the switching circuit is controlled to be disconnected, and modulation control is performed on the output phases as a whole;

when the photovoltaic inverter is in the grid connected state and an interphase imbalance occurs between the output phases, the switching circuit is controlled to be closed, and modulation control is separately performed on the output phases; or when the photovoltaic inverter is in an off-grid state, the switching circuit is controlled to be closed, and modulation control is separately performed on the output phases.

13. The photovoltaic inverter according to claim 1, wherein on/off of the switching circuit is controlled based on a working state of the photovoltaic inverter and interphase states of various output phases; and when the photovoltaic inverter is in a grid connected state and an interphase balance is achieved between the output phases, the switching circuit is controlled to be disconnected, and modulation control is performed on the output phases as a whole;

when the photovoltaic inverter is in the grid connected state and an interphase imbalance occurs between the output phases, the switching circuit is controlled to be closed, and modulation control is separately performed on the output phases; or when the photovoltaic inverter is in an off-grid state, the switching circuit is controlled to be closed, and modulation control is separately performed on the output phases.

14. The photovoltaic inverter according to claim 13, wherein when the photovoltaic inverter is in the grid connected state and the interphase balance is achieved between the output phases, when the interphase states of the output phases of the photovoltaic inverter switch from the interphase balance to the interphase imbalance, the switching circuit is controlled to be closed from being disconnected, and the modulation control performed on the output phases as a whole is switched to the modulation control separately performed on the output phases;

when the photovoltaic inverter is in the grid connected state and the interphase balance is achieved between the output phases, when the photovoltaic inverter switches from the grid connected state to the off-grid state, the switching circuit is controlled to be closed from being disconnected, and the modulation control performed on the output phases as a whole is switched to the modulation control separately performed on the output phases;

when the photovoltaic inverter is in the grid connected state and the interphase imbalance occurs between the output phases, when the interphase states of the output phases of the photovoltaic inverter switch from the interphase imbalance to the interphase balance, the switching circuit is controlled to be disconnected from being closed, and the modulation control separately performed on the output phases is switched to the modulation control performed on the output phases as a whole;

when the photovoltaic inverter is in the grid connected state and the interphase imbalance occurs between the output phases, when the photovoltaic inverter switches from the grid connected state to the off-grid state, the switching circuit keeps closed, and the modulation control is still separately performed on the output phases;

when the photovoltaic inverter is in the off-grid state, when the photovoltaic inverter switches from the off-grid state to the grid connected state and the interphase balance is achieved between the output phases, the switching circuit is controlled to be disconnected from being closed, and the modulation control separately performed on the output phases is switched to the modulation control performed on the output phases as a whole; or when the photovoltaic inverter is in the off-grid state, when the photovoltaic inverter switches from the off-grid state to the grid connected state and the interphase balance is achieved between the output phases, the switching circuit keeps closed, and the modulation control is still separately performed on the output phases.

15. The photovoltaic inverter according to claim 14, wherein the modulation control performed on the output phases as a whole is achieved through sine wave pulse width modulation (SPWM) or common-mode voltage injection modulation; and the modulation control separately performed on the output phases is achieved through the SPWM.

16. The photovoltaic inverter according to claim 13, wherein the modulation control performed on the output phases as a whole is achieved through sine wave pulse width modulation (SPWM) or common-mode voltage injection modulation; and the modulation control separately performed on the output phases is achieved through the SPWM.

17. The photovoltaic inverter according to claim 13, wherein whether the output phases of the photovoltaic inverter in the grid connected state are balanced is determined based on a difference between electrical signals of the output phases; and when a difference between a maximum phase and a minimum phase of an electrical signal in the electrical signals of the output phases exceeds a preset interphase threshold, it is determined that the output phases are in an interphase imbalanced state; when the difference between the maximum phase and the minimum phase of the electrical signal in the electrical signals of the output phases does not exceed the preset interphase threshold, the output phases are in an interphase balanced state.

18. The photovoltaic inverter according to claim 1, wherein the any one of the A-phase bridge arm, the B-phase bridge arm, and the C-phase bridge arm comprises a first switching transistor and a second switching transistor; and the freewheeling branch electrically connected to the midpoint of the any one of the A-phase bridge arm, the B-phase bridge arm, and the C-phase bridge arm comprises a third switching transistor and a fourth switching transistor, wherein a first terminal of the first switching transistor is electrically connected to a positive terminal, a second terminal of the first switching transistor is electrically connected to the midpoint, a first terminal of the second switching transistor is electrically connected to the midpoint, and a second terminal of the second switching transistor is electrically connected to a negative terminal;

a first terminal of the third switching transistor is electrically connected to the midpoint, a second terminal of the third switching transistor is electrically connected to a first terminal of the fourth switching transistor, and a second terminal of the fourth switching transistor is electrically connected to the neutral wire; and control terminals of the first switching transistor, the second switching transistor, the third switching transistor, and the fourth switching transistor are all electrically connected to a pulse modulation circuit.

19. The photovoltaic inverter according to claim 18, wherein at least one of the first switching transistor, the second switching transistor, the third switching transistor, and the fourth switching transistor is an insulated-gate bipolar transistor (IGBT).

20. A control method of a photovoltaic inverter, wherein the control method is configured to control the photovoltaic inverter according to claim 1, and comprises:

controlling the switching circuit to be in a turned-on state from a closed state, to control the photovoltaic inverter to switch from SPWM to common-mode voltage injection modulation.

* * * * *